B. E. REED.
CORN HARVESTER.
APPLICATION FILED MAY 22, 1908.

938,335.

Patented Oct. 26, 1909.
5 SHEETS—SHEET 1.

Witnesses
Jas. F. McCathran
H. F. Riley

Inventor
Benjamin E. Reed,
By
E. G. Siggers
Attorney

UNITED STATES PATENT OFFICE.

BENJAMIN ERNEST REED, OF GOLDSBORO, MARYLAND.

CORN-HARVESTER.

938,335.  Specification of Letters Patent.  Patented Oct. 26, 1909.

Application filed May 22, 1908. Serial No. 434,303.

*To all whom it may concern:*

Be it known that I, BENJAMIN E. REED, a citizen of the United States, residing at Goldsboro, in the county of Caroline and State of Maryland, have invented a new and useful Corn-Harvester, of which the following is a specification.

The invention relates to improvements in corn harvesters.

The object of the present invention is to improve the construction of corn harvesters, and to provide a simple and comparatively inexpensive corn harvesting machine of sufficiently light construction to enable it to be drawn by a single horse, and adapted to be operated by any one who can drive, and capable of cutting standing corn and of retaining the same within it until a sufficient quantity has been accumulated, and of readily discharging the same, so that the corn will be cut and piled at intervals.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the invention, may be resorted to without departing from the spirit or sacrificing any of the advantages of the invention.

In the drawings: Fig. 2 is a side elevation of the same.

Like numerals of reference designate corresponding parts in all the figures of the drawings.

1 designates a substantially horizontal frame, designed to be constructed of any suitable material and supporting a floor 2 and composed of longitudinal beams and transverse connecting bars. The frame is supported at the rear portion by a traction wheel 3 and a carrying wheel 4, mounted on stub axles 5 and 6 of adjustable brackets 7 and 8. The adjustable brackets 7 and 8 preferably consist of castings, and are provided at intervals with vertical series of perforations for the reception of bolts for securing the frame to the brackets. By this construction the frame is adapted to be raised and lowered to arrange a knife 9 the desired distance from the ground. The left hand bracket 7 has upper and lower transverse perforations 10 and 11 for the reception of bolts 13 and 14, securing the brackets to a casing 12 and the frame 1, and the said bracket 7 is also provided with perforations 15, disposed longitudinally of the machine for the reception of a bolt 16, which secures a rear transverse bar 17 of the frame to the rear edge of the bracket 7. The upper perforations 10 are formed in an extension or arm 18 of the bracket 7, and the casing, which is located at the left hand side of the frame of the machine, contains operating mechanism for locking, tripping and resetting a dumping table or platform 19. The other bracket 8 is provided with perforations 20, extending longitudinally of the machine and receiving a bolt 21 for securing the rear transverse bar 17 to the said bracket 8, and the latter is also provided with transverse perforations 22 for the reception of a bolt 23 for securing the rear end of the upper longitudinal side bar 24 to the bracket 8. The longitudinal side bar 24, which is arranged horizontally, is located a short distance above the floor or platform of the machine, as clearly illustrated in Fig. 2 of the drawings, and it is supported by a front inclined brace 25, an intermediate brace 26 and a short rear vertical bar 27. The frame is provided at the left hand side with a tapering front extension 28 having a front upwardly and forwardly extending arm 29, which is supported by a vertical stem or standard 30, mounted on an axle 31 and extending upwardly therefrom. The front arm 29, which is provided with an opening to receive the stem or standard 30, rests upon a collar 32, having a set screw 33 and adapted to be adjusted vertically on the stem or standard 30 to raise and lower the front of the machine. By raising and lowering the frame, the knife 9 may be positioned the proper distance from the ground for cutting the standing corn as close to the ground as desired. The knife, which is located at the front of the machine, is disposed diagonally and consists of a front or outer cutting portion and an inner or rear attaching portion. The inner or rear attaching portion is arranged horizontally and is secured to the bottom of the frame. The front cutting portion is arranged at an inclination and extends upward and forward from the rear horizontal attaching portion.

The axle 31 is provided at its ends with spindles for the reception of a pair of front guiding wheels 34, and the stem or standard 30 is equipped at its upper end with a cross head 35, to which are pivoted the rear ends of a pair of shafts 35, connected in advance of the cross head by a cross bar 37, which supports a pivotally mounted swingletree 38. The machine is guided by guiding the draft animal, which when turned to the right or left, turns the front axle and changes the direction of the front guiding wheels 34. Although a pair of front guiding wheels is illustrated in the accompanying drawings, yet it will be readily understood that a single guiding wheel may be arranged for supporting the front extension of the frame. The front extension of the frame also carries a seat 39 for the accommodation of the driver. The seat is secured to the upper end of a seat standard 40, which has its lower end 41 arranged horizontally and bolted or otherwise secured to the said extension of the frame.

Figures 3, 8, 11, 12, 13, 14:
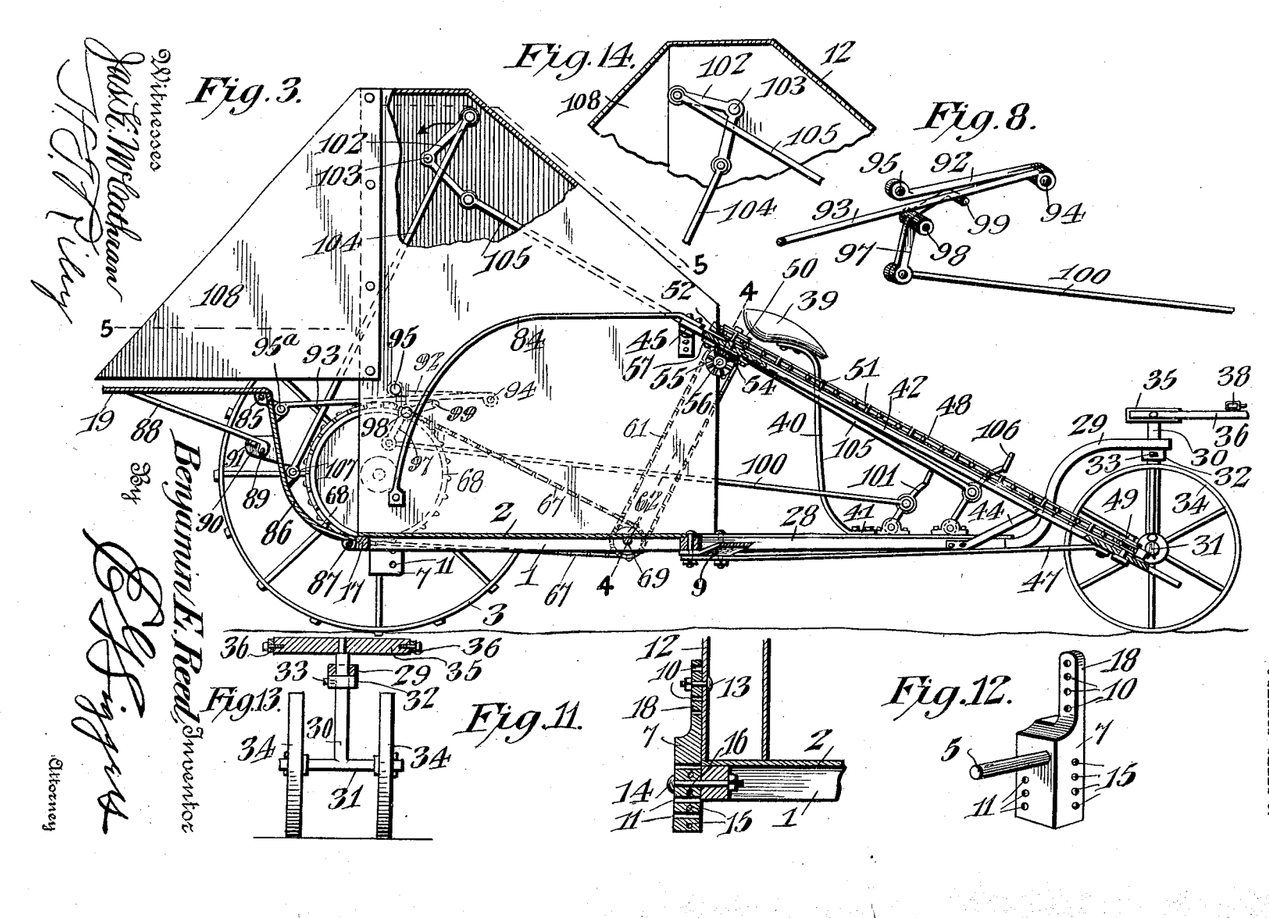
Fig. 3 is a longitudinal sectional view.
Fig. 8 is a detail view, illustrating the construction for locking and tripping the dumping table or platform.
Figs. 10 to 12 inclusive are detail views, illustrating the construction of the brackets carrying the stub axles.
Fig. 13 is a transverse sectional view, taken substantially on the line 13—13 of Fig. 1 and illustrating the manner of supporting the front of the frame.
Fig. 14 is a detail view of the setting mechanism, illustrating the position of the connecting rods and the bell crank lever when the dumping table or platform is down.
Figure 4:
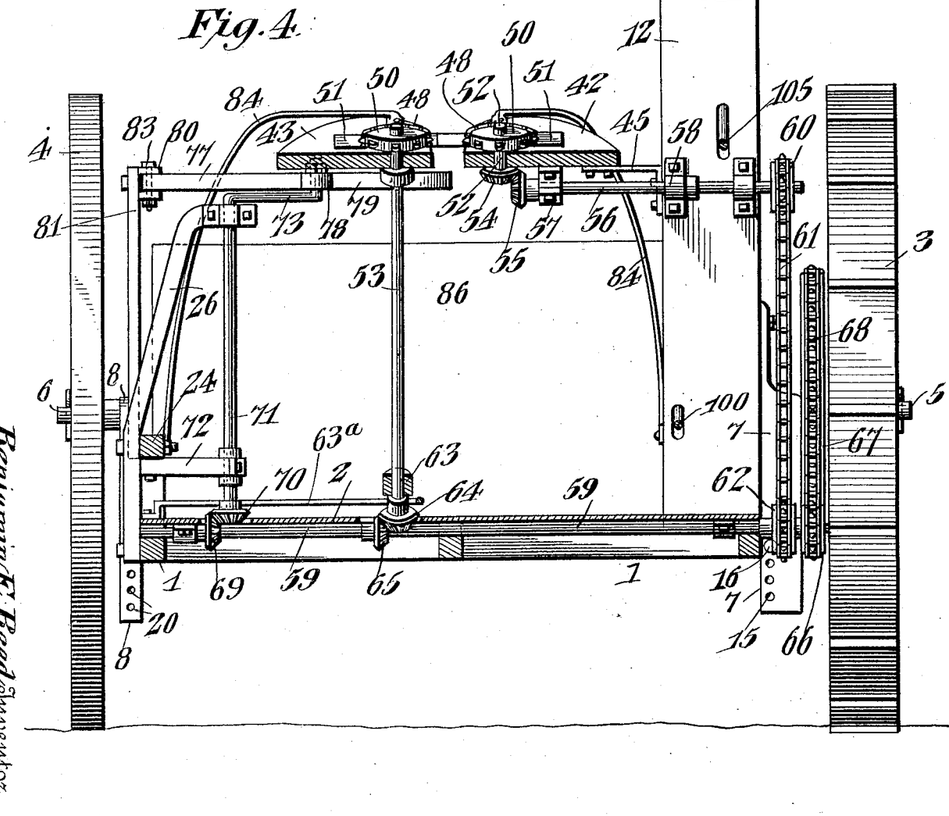
Fig. 4 is a transverse sectional view, taken substantially on the line 4—4 of Fig. 3.

The corn harvesting machine is equipped at its front with a pair of inclined guide boards 42 and 43, preferably constructed of wood to render the machine as light as possible, but they may be constructed of any other suitable material, as will be readily understood. The guide boards 42 and 43, which are spaced apart to form a passageway for the corn, have rearwardly converging inner side edges and are rounded at their front edges at the inner side to form a flaring mouth for guiding the standing corn into the said passage-way. The left hand guide board is supported at its front portion by an inclined brace 44, and it is connected at its rear portion with the casing 12 by a substantially L-shaped bracket 45. The inclined front brace 44 extends from the inner edge of the front extension of the frame to the adjacent side edges of the left hand guide board, as clearly shown in Figs. 1 and 3 of the drawings. The rear supporting bracket has a vertical attaching portion, and is provided with a transversely disposed supporting portion, the attaching portion being fastened to the casing, and the supporting portion extending beneath the rear end of the left hand guide board 42. The right hand guide board is supported by a longitudinal brace 46, located at the outer side of the right hand guide board and extending from the front portion thereof to the frame of the machine. The rear portion of the right hand guide board is connected with the frame of the machine by the brace 25. The machine is also provided with a pair of lower guide rods 47, disposed longitudinally of the passage-way for the corn, and secured at their rear ends to the frame at the ends of the knife 9 and extending forwardly therefrom to the outer portions of the guide boards 42 and 43. The rods, which retain the lower portions of the stalks of corn in the passage-way, also serve to brace and retain the inclined guide boards in position. As the guide boards are light in structure, they require but comparatively little bracing means for supporting them in position, but any other preferred arrangement of brace may be employed, as will be readily understood.

The corn is positively fed rearwardly along the central longitudinal passage-way by endless feed chains 48, located at the upper faces of the inclined guide boards and arranged on front and rear sprocket wheels 49 and 50. The feed chains are provided at intervals with lugs or projections 51, which engage and carry the corn rearward through the passage-way between the inclined guide boards. The knife 9 is set at an angle and the feed chains, which carry the corn rearward into engagement with the knife, insure a positive cutting of the corn. The front sprocket wheels 49 are mounted on suitable stub shafts, and the rear or drive sprocket wheels are carried by inclined shafts 52 and 53. The inclined shaft 52 of the left hand feed chain is short and extends through and projects slightly beyond the lower face of the left hand guide board 42, and it is provided at its lower end with a bevel gear 54, which meshes with a similar bevel gear 55 of a short upper transverse shaft 56, journaled in suitable bearings 57 and 58 of the guide board 42 and the casing 12, and connected at its outer end with a lower main transverse shaft 59 by a sprocket gearing. The outer end of the upper transverse shaft 56 is provided with a sprocket wheel 60, receiving an inclined sprocket chain 61, which is also arranged on a lower sprocket wheel 62 of the main transverse shaft 59. The other inclined shaft 53 extends from the upper rear end of the guide board 43 to the platform or floor of the machine, and is journaled in suitable bearings of the guide board 43 and a bracket 63, secured to the frame of the machine. The lower end of the inclined shaft 53 is provided with a bevel gear 64, which meshes with a bevel gear 65, secured to the main transverse shaft at a point intermediate of the ends thereof. The machine is equipped with a lower guard 63ª consisting of a transversely disposed rod, secured at its outer end to the frame of the machine, and extending from the right hand side thereof to the lower portion of the inclined shaft 53, and having an inner curved portion, extending around the shaft and spaced from the gearing and adapted to prevent the severed stalks from coming in contact with the gearing for communicating motion to the inclined shaft 53.

Figures 1, 7:
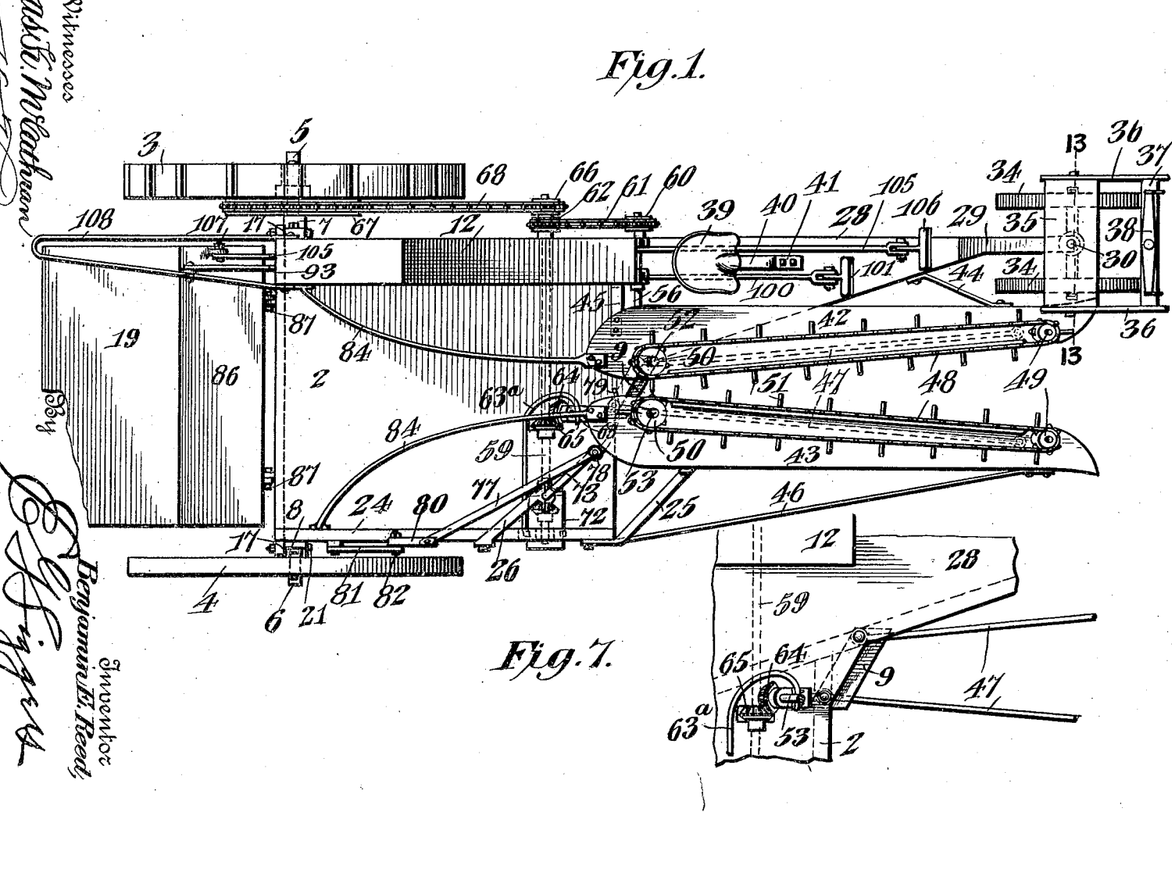
—Figure 1 is a plan view of a corn harvesting machine, constructed in accordance with this invention.
Fig. 7 is a detail view, illustrating the arrangement of the front knife and the front guide rods.

The main transverse shaft, which is journaled in suitable bearings of the frame of the machine, extends entirely across the same, and it is provided at its left hand end with a sprocket pinion 66, which is connected with a sprocket wheel 67 of the traction wheel 3 by a sprocket chain 68. The sprocket wheel 67 is suitably connected with the traction wheel, and the machine may be equipped with any desired form of clutch mechanism for throwing it into and out of operation. When the machine moves forward motion is communicated from the traction wheel through the sprocket gearing to the main transverse shaft, which operates the feed chains by the gearing before described. The main transverse shaft is also provided adjacent to its right hand end with a vertical bevel gear 69, which meshes with a horizontal bevel gear 70 of the lower end of a vertical crank shaft 71, journaled in suitable bearings of a lower horizontal brace 72 and the intermediate inclined brace 26. The brace 26 extends upward from the longitudinal beam 24, and it is provided at its upper end with a bearing for the vertical crank shaft 71. The lower brace 72 extends inward from the longitudinal bar 24, and is provided at its inner end with a bearing, which supports the vertical crank shaft 71 near the lower end thereof. The shaft 71 is provided at its upper end with a crank 73, which carries and actuates a feeding lever 77, provided at an intermediate point with an eye 78 for the reception of the crank 73, and having an inner front curved portion 79 for engaging the severed corn. The feeding lever 77, which is set at an angle, is connected at its rear end by a coupling 80 with an upright oscillatory link or lever 81, pivoted at its lower end to the frame of the machine at the upper end of the short vertical bar 27. The coupling, which is connected at its rear end to the upper end of the oscillatory link or lever 81 by a horizontal pivot 82, has its front portion bifurcated to receive the rear end of the feeding lever 77, which is secured to the coupling by a vertical pivot 83. The upright oscillatory lever 81 permits the horizontally disposed feeding lever to move backwardly and forwardly, and the rotary movement of the crank shaft carries the curved front corn-engaging portion inwardly and outwardly in addition to the said backward and forward movement. The feeding lever is moved inwardly at a point above the rear or right hand end of the knife, as illustrated in Fig. 1 of the drawings, and it presents a concave rear face to the corn, which is carried rearwardly over the floor or platform by the backward movement of the feeding lever. The feeding lever is withdrawn from engagement with the corn at the limit of its rearward movement, and it is carried outwardly, and moved forwardly while out of engagement with the corn.

Figures 5, 6:
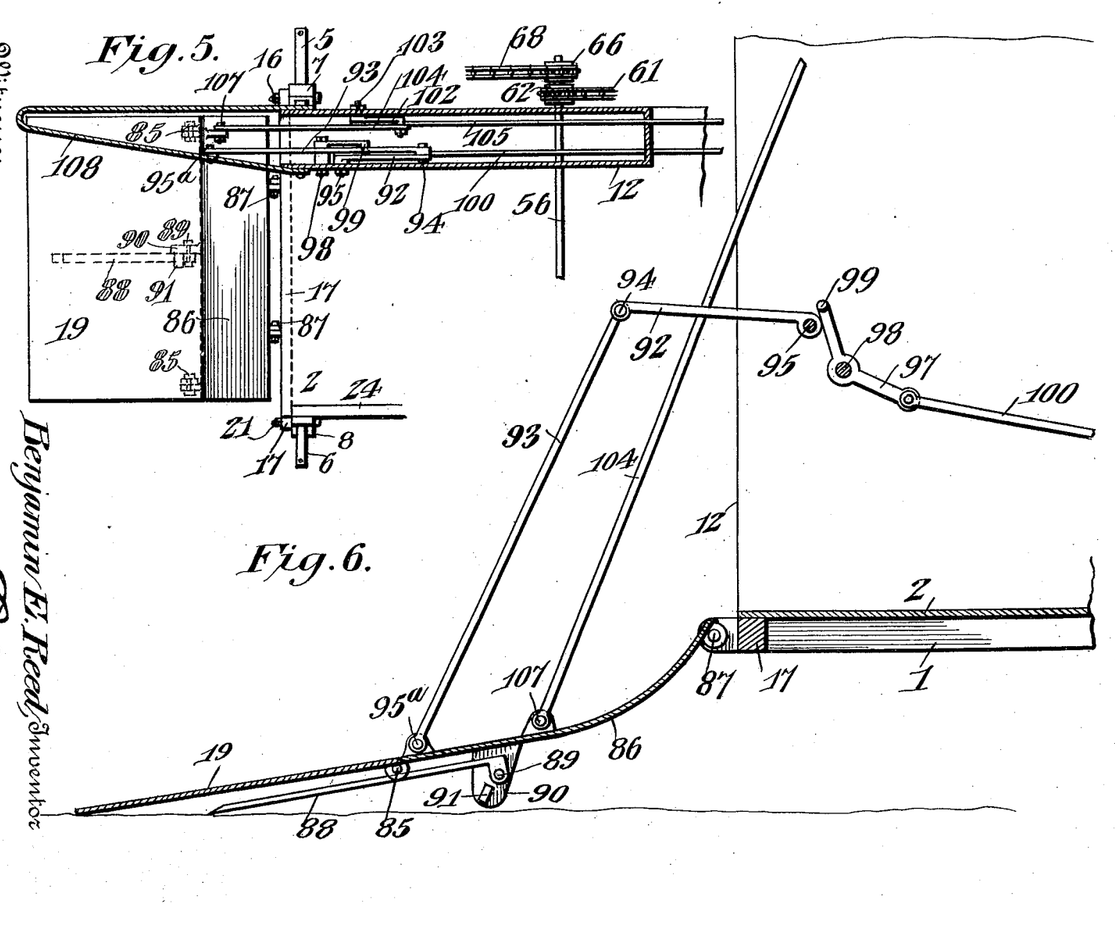
Fig. 5 is a horizontal sectional view, taken substantially on the line 5—5 of Fig. 3.
Fig. 6 is an enlarged detail sectional view of the rear portion of the machine, the table or platform being dumped for discharging a load.
Figures 7, 9, 10:
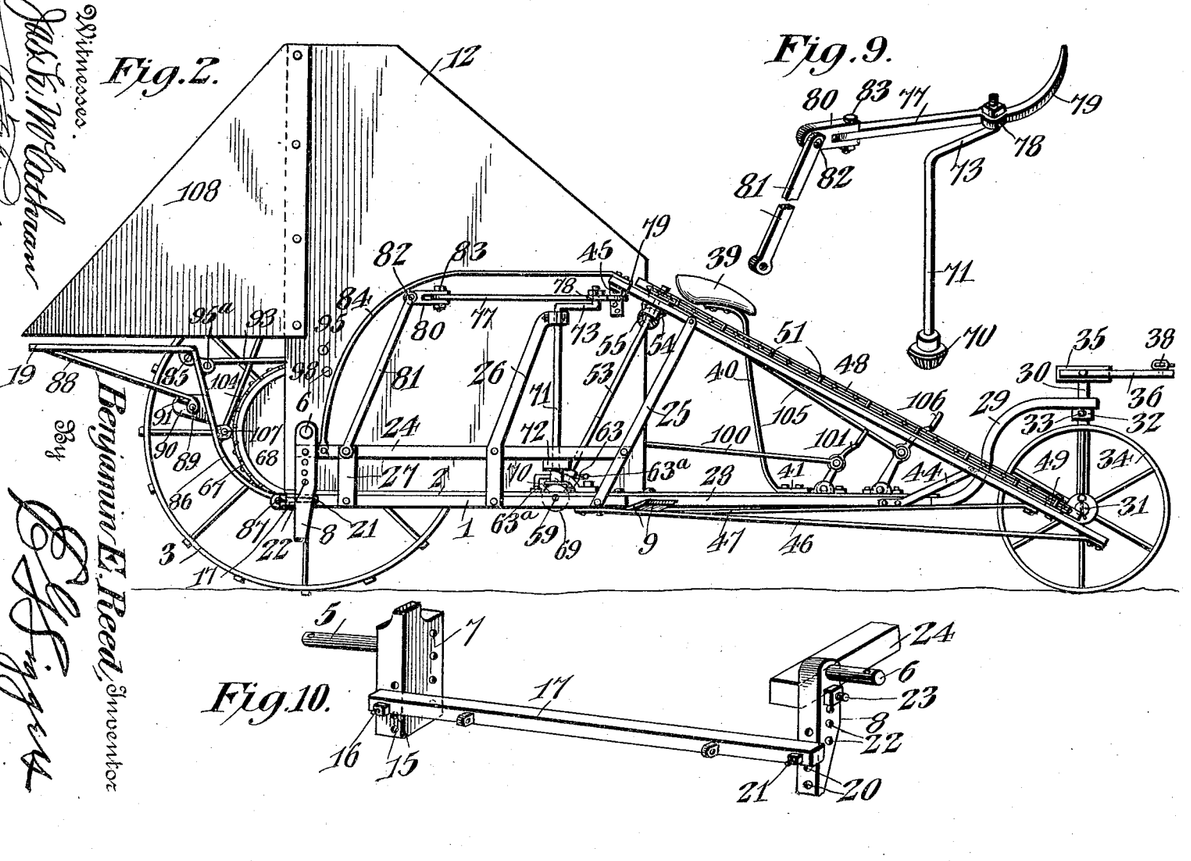
Fig. 9 is a detail view of the rear feeding device.

The severed corn is maintained at the median line of the floor or platform until it reaches the rear portion thereof by means of a pair of curved guards or guides 84, consisting of rods secured at their front ends to the rear ends of the guide boards 42 and 43, and provided with front horizontal portions spaced apart to provide a passage-way for the corn and diverging rearwardly slightly. The rear portions of the guide rods are curved downwardly and laterally and are secured at their rear terminals to the machine at opposite sides thereof at points a short distance above the platform. The rear end of the left hand guide rod 84 is secured to the casing, and the rear end of the right hand guide rod is fastened to the longitudinal bar 24. The severed corn is caused by the feeding mechanism to move rearwardly over the floor or platform, and to fall upon the rear dumping table or platform, arranged horizontally when in its set or supporting position, and connected at its front edge by suitable hinges 85 to a rear wall 86. The rear wall 86 is connected at its lower edge with the transverse bars 17 of the frame of the machine by hinges 87. The upper portion of the wall is arranged at a slight inclination, and its lower portion is curved, as clearly shown in Fig. 3 of the drawings. The dumping table or platform is maintained in a horizontal position by a pivoted supporting brace 88, extending upwardly and rearwardly from the hinged rear wall 86 to the outer portion of the table or platform 19, and provided at its lower front end with a perforation, through which passes a pivot 89, which secures the brace to an ear or flange 90. The ear or flange 90, which projects from the rear face of the hinged wall 86, is provided beyond the pivotal point of the brace with a laterally projecting lug 91, located above the plane of the pivot 89 and arranged to receive and support the brace and limiting the downward movement thereof. The lug supports the pivoted brace at an inclined position, when the rear wall of the machine is in an upright position. When the hinged platform and the rear wall are tripped by the means hereinafter described, the brace is adapted to swing upwardly with relation to the hinged wall and downwardly with the same, and the parts are thereby permitted to straighten or flatten out on the ground, as illustrated in Fig. 6 of the drawings, to cause the corn to be quickly and completely discharged at the rear end of the machine. When the table or platform is tripped, the hinged rear wall extends downward and rearward from the frame of the machine at an inclination, and the table or platform forms a continuation of the hinged rear wall. When the hinged wall is swung upward from the position shown in Fig. 6, it carries with it the dumping table or platform which assumes its normal horizontal position, and it is supported in such position by the brace, which is limited in its relative downward movement by the lug 91.

The hinged rear wall is retained in its normal upright position by means of a pair of locking links 92 and 93, connected together by a hinge joint 94. The front link 92, which is shorter than the rear link 93, is pivoted to the inner face of the inner side wall of the casing by a bolt 95, or other suitable fastening device, and the long rear link 93 is pivoted at its rear end by a rivet 95ª and the ear extending from the inner or front fact of the rear wall 86 near the upper edge thereof. When the front link 92 is swung forward to a horizontal position by the upward movement of the hinged rear wall, the rear link overlaps the front link and extends in advance of the pivotal point thereof, and the connected ends of the links are dropped slightly below the horizontal plane of the pivot 95 and are supported in such position by a tripping lever 97, whereby they are adapted to form a lock for securing the hinged rear wall in an upright position. The links are swung upward from their locked position by the tripping lever 97, fulcrumed intermediate of its ends on a bolt 98, and composed of upwardly and downwardly extending arms. The upwardly extending arm is approximately L-shaped, being provided with a laterally extending portion 99, which forms a support for the links when the latter are in their locking position. The lower arm of the tripping lever is connected by a rod 100 with a foot lever 101. The foot lever 101 is mounted on the front extension of the frame of the machine adjacent to the lower end of the seat standard, and it is pivoted at its lower end and is connected at an intermediate point with the front end of the rod 100, and is provided at its upper end with a foot plate or portion. When the links are in their locked position, the foot lever 101 extends upwardly and forwardly at an inclination, and is adapted to be pressed downwardly and forwardly to oscillate the tripping lever. This movement of the foot lever swings the upwardly extending arm of the tripping lever upward and rearward, carrying the connected ends of the links above the horizontal plane of the pivot 95 of the front link, and permitting the weight of the severed stalks to swing the dumping table or platform and the rear wall downwardly, whereby the severed corn is positively discharged from the machine. The dumping table or platform and the hinged rear wall are permitted to remain in their dumping or discharge position until the cut corn is entirely clear of the machine, and they are then swung upward to their normal position by setting mechanism.

The setting mechanism consists of a bell crank lever 102, pivoted at its angle to the inner face of the outer side wall of the casing by a bolt 103, and connected by a rear rod 104 to the rear wall 86 of the machine and by a front rod 105 to a foot lever 106. The rear rod 104, which is arranged at an inclination, extends downwardly and rearwardly from one arm of the bell clank lever to the hinged rear wall 86, which is provided with an ear for the reception of a pivot 107 of the lower end of the connecting rod. The arm to which the rear connecting rod is pivoted, extends upwardly and forwardly when the rear wall 86 is in its normal position, and the other arm of the bell crank lever extends forwardly and downwardly, as clearly shown in Fig. 3 of the drawings, when the rear wall is in such position. The front connecting rod is pivoted to the foot lever 106 at a point intermediate of the ends thereof, and the lower end of the foot lever is pivoted to the front extension of the frame of the machine, and is provided at its upper end with a foot plate or portion. The rear connecting rod extends upwardly in advance of the pivot 103 of the bell crank lever, when the rear wall is in its normal position, and the downward swinging of the rear wall rotates the bell crank lever in a direction of the arrow in Fig. 3 of the drawings, and carries the same to the position shown in Fig. 14 of the drawings. The upper arm of the bell crank lever moves downward and the lower arm moves rearward, and the dumping table or platform and the hinged rear wall are set by a forward movement of the foot lever 106, which returns the bell crank lever to the position shown in Fig. 3. The forward movement of the foot lever swings the lower rear arm of the bell crank lever forwardly and moves the other arm upwardly, carrying the rear connecting arm upward and thereby swinging the rear wall 86 upward. The setting of the rear wall and the platform returns the links 92 and 93 to their locking position. When the dumping table or platform and the rear wall are swung downward, the rear link is arranged at an inclination and extends upwardly and forwardly, while the front link 92 is disposed in substantially a horizontal position. The upward movement of the rear wall moves the rear link 93 upwardly and forwardly and swings the short front link 92 forwardly to its locking position in advance of the pivot 95.

The casing conceals and protects the tripping and setting mechanism, and its front walls are provided with slots or openings, through which the connecting rods 100 and 105 pass. The casing, which is open at the lower portion of the back, is equipped at the upper portion with an approximately triangular wing or extension 108, constructed of sheet metal, or other suitable material, which is bent to form two approximately triangular sides. The triangular extension or wing, which is located above the platform 19, is secured to the side walls of the casing, as clearly shown in Fig. 5 of the drawings. The rear feeding lever by being located at the right hand side of the machine, has a tendency to crowd the severed corn toward the left hand side thereof, and the rearward extension or wing 108 by being located at the left hand side of the machine, prevents the corn from falling off the left hand end of the dumping table or platform 19.

Having thus fully described my invention, what I claim as new and desire to secure by Letters Patent, is:—

1. A corn harvesting machine including a frame provided at one side of the center with a front extension, centrally arranged guiding means spaced apart to form a passageway for the corn and spaced from the said extension, cutting mechanism arranged to sever the stalks at the rear end of the passage-way, wheels supporting the rear portion of the frame and the front extension thereof, and draft mechanism connected with the front extension.

2. A corn harvesting machine including a frame provided at one side with a front extension having an upwardly extending arm, guiding means arranged centrally of the machine at the inner side of the said extension and forming a passage-way for the corn, cutting mechanism arranged to sever the stalks at the rear end of the passage-way, wheels supporting the rear end of the frame, a front axle provided with a vertical standard pivotally connected to and supporting the arm of the front extension of the frame, wheels mounted on the front axle, and draft mechanism connected with the standard.

3. A corn harvesting machine including a frame provided with a front extension located at one side of the center of the machine, guiding means located at the inner side of the extension in spaced relation with the same and disposed centrally of the machine and forming a passage-way for the corn, means for cutting the corn, wheels supporting the rear portion of the frame, a front standard pivotally connected with the extension of the frame and provided with a supporting wheel, a cross head mounted on the standard, and shafts connected to the cross head.

4. A corn harvesting machine including a frame provided at one side with a front extension, centrally disposed guide boards mounted on the frame and being substantially coextensive in length with the extension of the frame, feeding means mounted on the guide boards, means arranged to sever the stalks when the same reach the rear ends of the guide boards, wheels supporting the rear portion of the frame and the extension of the same, and a seat mounted on the said extension.

5. A corn harvesting machine including a frame provided at one side with a front extension, centrally disposed guide boards mounted on the frame and being substantially coextensive in length with the extension of the frame, feeding means mounted on the guide boards, means for severing the stalks when the same reach the rear ends of the guide boards, wheels supporting the rear portion of the frame, a pivotal guide wheel supporting the front extension of the frame, and a seat mounted on the extension of the frame.

6. A corn harvesting machine including a frame provided at the front with an extension located at one side of the center of the machine, draft mechanism connected with the extension, inclined guide boards extending from the front of the frame and supported by the same, said guide boards being spaced apart to form a passage-way for the corn, means for severing the stalks at the rear end of the passage-way, and lower guide rods extending from the lower ends of the guide boards to the frame.

7. A corn harvesting machine including a frame provided at the front with an extension located at one side of the center of the machine, draft mechanism connected with the extension, inclined guide boards extending from the front of the frame and supported by the same, said guide boards being spaced apart to form a passage-way for the corn, means for severing the corn at the rear end of the passage-way, and lower approximately horizontal guide rods extending from the outer ends of the guide boards and connected to the frame at opposite sides of the cutting means.

8. A corn harvesting machine including front centrally arranged guide boards set at an inclination, cutting mechanism, rear guide rods spaced apart and secured at their front ends to the guide boards and diverging downwardly and rearwardly, and a dumping table located above and in rear of the rear ends of the guide rods.

9. A corn harvesting machine including a wheeled frame having a floor, means for cutting the corn, a dumping table or platform elevated with respect to the said floor and arranged at the back of the frame, and guide rods mounted on the frame and diverging rearwardly for guiding the severed corn to the dumping table or platform and terminating in advance of the latter and at a point below the front of the same.

10. A corn harvesting machine including a wheeled frame having a floor, means for cutting the corn, a dumping table or platform elevated with respect to the said floor and arranged at the back of the frame, and guide rods mounted on the frame in rear of the cutting mechanism for guiding the severed corn to the dumping table or platform and terminating in advance of the latter and below the front of the same, said guide rods being provided with rearwardly diverging upper horizontal portions and having downwardly and laterally curved rear portions.

11. A corn harvesting machine including a frame, mechanism for cutting the corn, and means for feeding the corn rearwardly, said feeding means comprising a crank shaft, a feeding lever connected at an intermediate point to the crank shaft, and an upright oscillatory link arranged to swing longitudinally of the machine and connected with the feeding lever.

12. A corn harvesting machine including a frame, mechanism for cutting the corn, and means for feeding the corn rearwardly, said feeding means comprising a crank shaft, a horizontal feeding lever connected at an intermediate point with the crank shaft, an upright oscillatory link arranged to swing longitudinally of the machine, and a coupling member having vertical and horizontal pivots connected, respectively, with the feeding lever and the upright oscillating link.

13. A corn harvesting machine including a frame, mechanism for cutting the corn, and means for feeding the corn rearwardly, said feeding means comprising a horizontal feeding lever disposed diagonally of the machine and having a curved front corn-engaging portion, a crank shaft connected with the feeding lever at a point intermediate of the ends thereof, an upright oscillatory link located at one side of the machine and arranged to swing longitudinally thereof, and means for connecting the outer end of the feeding lever with the upper end of the oscillatory link.

14. A corn harvesting machine including a frame, guide boards mounted on the frame at the front thereof and forming a passage-way for the corn, front feeding means located at opposite sides of the passage-way, means for cutting the corn, guide rods connected at their front ends with the guide boards and diverging rearwardly therefrom for guiding the severed corn, a horizontally disposed feeding lever having an inner curved portion arranged to extend into the space between the guide rods for feeding the severed corn rearwardly, a crank shaft connected with the feeding lever at a point between the ends thereof, and an upright oscillatory link connected with the feeding lever at the outer portion thereof.

15. A corn harvesting machine including a wheeled frame, guide boards extending from the front of the frame, endless feeding chains disposed longitudinally of the guide boards and provided with means for engaging the corn, a main transverse shaft extending across the frame, an inclined shaft geared to the main transverse shaft and connected with one of the feeding chains for actuating the same, an upper transverse shaft connected with the other feeding chain, gearing for connecting the transverse shafts, a vertical crank shaft geared to the main transverse shaft, means for operating the latter, a longitudinally disposed feeding lever connected with and actuated by the crank shaft, and an upright oscillatory link pivotally connected with and supporting one end of the feeding lever.

16. A corn harvesting machine including a frame, mechanism arranged at the front of the frame for cutting the corn, means for guiding the severed corn rearwardly, a dumping table or platform arranged at the back of the frame, mechanism located at one side of the machine for feeding the severed corn rearwardly, and a side or wing located at the opposite side of the frame and arranged above the dumping table or platform to retain the severed corn thereon.

17. A corn harvesting machine including a frame, cutting mechanism arranged at the front of the machine for severing the corn, means for guiding the severed corn rearwardly, a dumping table or platform located at the back of the machine, a casing mounted on the frame of the machine at one side thereof, an extension or wing supported by the casing and extending over the dumping table or platform for retaining the corn thereon, and mechanism mounted within the casing for raising and lowering the dumping table or platform.

18. A corn harvesting machine including a frame, a dumping platform arranged at the rear end of the frame, a casing mounted on the frame at the left hand side thereof, a rearward extension or wing secured to the casing and located above the dumping table or platform to retain the corn thereon, mechanism arranged at the front of the frame for cutting the corn, means for guiding the corn rearwardly to the dumping table or platform, a feeding lever located at the right hand side of the frame for feeding the corn rearwardly, and means for operating the feeding lever.

19. A corn harvesting machine including a frame having a platform, inclined feeding chains arranged at the front of the machine, a lower transverse shaft, an inclined shaft connected with and extending from one of the feeding chains to the lower transverse shaft, gearing connecting the lower end of the inclined shaft with the transverse shaft, a guard located adjacent to the platform and having a curved portion arranged in spaced relation with and extending partially around the said gearing to prevent the severed corn from coming in contact therewith, and means for communicating motion from the other feeding chain.

20. A corn harvesting machine including a frame, inclined feeding chains arranged at the front of the machine, a lower transverse shaft, an inclined shaft connected with and extending from one of the feeding chains to the lower transverse shaft, gearing connecting the lower end of the inclined shaft with the transverse shaft, and a guard consisting of a rod extending from one side of the machine to the gearing at the lower end of the inclined shaft and having a curved portion arranged in spaced relation with the gearing for preventing the severed corn from coming in contact with the same.

In testimony, that I claim the foregoing as my own, I have hereto affixed my signature in the presence of two witnesses.

BENJAMIN ERNEST REED.

Witnesses:
ELMER B. SEREY,
B. HACKETT TURNER.